United States Patent
Ishikawa

(10) Patent No.: US 7,263,081 B2
(45) Date of Patent: Aug. 28, 2007

(54) HANDOVER PROCESS FREE OF SHORT-BREAK AND PACKET LOSS IN CDMA MOBILE COMMUNICATION SYSTEM ON IP NETWORK

(75) Inventor: Yasuaki Ishikawa, Minato-ku (JP)

(73) Assignee: NEC Corporation, Tokyo (JP)

( * ) Notice: Subject to any disclaimer, the term of this patent is extended or adjusted under 35 U.S.C. 154(b) by 130 days.

(21) Appl. No.: 11/246,130

(22) Filed: Oct. 11, 2005

(65) Prior Publication Data

US 2006/0079234 A1    Apr. 13, 2006

(30) Foreign Application Priority Data

Oct. 13, 2004    (JP)    ............... 2004-299220

(51) Int. Cl.
*H04Q 7/20* (2006.01)
*H04Q 7/38* (2006.01)
(52) U.S. Cl. .............. 370/331; 370/329; 370/328; 370/356; 370/335; 370/338; 370/342; 370/343; 455/436; 455/442; 455/426.1; 455/426.2; 455/445; 455/440; 455/438
(58) Field of Classification Search ............... 370/331, 370/329, 328, 335, 338, 341, 342, 343, 356; 455/436, 437, 438, 442, 440, 439, 443, 445, 455/422.1, 426.1, 426.2, 403, 414.1, 414.2, 455/414.3, 414.4, 500, 517, 550.1, 552.1
See application file for complete search history.

(56) References Cited

U.S. PATENT DOCUMENTS

2002/0141360 A1    10/2002    Baba et al.
2002/0167921 A1    11/2002    Vakil et al.
2003/0176187 A1    9/2003    Menzel et al.
2004/0125795 A1*    7/2004    Corson et al. .............. 370/356

(Continued)

FOREIGN PATENT DOCUMENTS

EP    1 558 047 A1    7/2005

(Continued)

OTHER PUBLICATIONS

Zhang Tao et al.: "IP-Based Base Stations and Soft Handoff in All-IP Wireless Networks" IEEE Personal Communications, IEEE Communications Society, US, Oct. 2001, pp. 24-30, XP000864164 ISSN: 1070-9916 *p. 27, left-hand column, line 35-p. 28, right-hand column, line 20*.

*Primary Examiner*—Keith Ferguson
(74) *Attorney, Agent, or Firm*—Sughrue Mion, PLLC

(57) ABSTRACT

When a mobile node makes handover, the mobile node issues a binding update message and sends the binding update message to a base transceiver station from which handover is made. When the base transceiver station from which handover is made sends radio data to the mobile node, it also transfers the same data to a base transceiver station to which handover is made, so that the base transceiver station to which handover is made also sends the radio data to the mobile node. As a result, the mobile node receives the radio data via an IP network from both the base transceiver station from which handover is made and the base transceiver station to which handover is made. Since the mobile node makes soft handover, the handover can be made without causing a communication short-break and a packet loss.

2 Claims, 6 Drawing Sheets

U.S. PATENT DOCUMENTS

2005/0088994 A1* 4/2005 Maenpaa et al. .......... 370/331

FOREIGN PATENT DOCUMENTS

| JP | 2002-171558 A | 6/2002 |
| JP | 2004-135178 A | 4/2004 |
| JP | 2004-193786 A | 7/2004 |
| JP | 2004-228754 A | 8/2004 |
| WO | WO 02-35738 A1 | 5/2002 |

* cited by examiner

HANDOVER PROCESS FREE OF SHORT-BREAK AND PACKET LOSS IN CDMA MOBILE COMMUNICATION SYSTEM ON IP NETWORK

BACKGROUND OF THE INVENTION

1. Field of the Invention

The present invention relates to a handover process for use in a CDMA (Code Division Multiple Access) mobile communication system implemented on an ALL-IP (Internet Protocol) network.

2. Description of the Related Art

In recent years, the popularity of mobile communication systems has been prompting communication service providers to reduce excessive burdens such as high frequency charges and communication facility expenses. In addition, as communication computerization advances, growing attention is directed to the fusion of mobile communication networks and IP networks, and may communication service providers are thinking about converting mobile communication networks into ALL-IP networks especially for the purpose of lowering facility costs.

At present, CDMA mobile communication systems which are employed as the main stream of third-generation mobile communication systems are capable of providing stable short-break (temporary blackout, intermittent discontinuity) free communication quality by allowing a mobile terminal to communicate simultaneously with a plurality of base stations by way of soft handover when the mobile terminal moves between cells. With the introduction of the IPv6 (Internet Protocol Version 6), the number of assignable IP addresses will drastically be increased, and an ALL-IP mobile communication network may be realized in the IPv6 environment with fixed IP addresses assigned to respective mobile terminals. However, sufficient efforts have not yet been made to study an IP technology for realizing soft handover between base stations on different IP networks.

For example, if a CDMA mobile communication system and an IP network are connected to each other, and IP communications are performed between a correspondent node (hereinafter referred to as CN) and a mobile node (hereinafter referred to as MN) using a fixed IP address without regard to movement of the MN, then a short-break or a packet loss tends to occur upon handover because it has heretofore been unable to connect the CN and the MN to each other via a plurality of base transceiver stations (hereinafter referred to as BTS) at the same time. As a result, the advantages of CDMA cannot fully be utilized, and communication failures are liable to occur. Therefore, the CDMA mobile communication system cannot enjoy the advantages of CDMA even if combined with the IP network technology.

Furthermore, inasmuch as the MN excessively issues binding update messages at a boundary between cells, and a large amount of transfer data is present between IP networks if the metric (an indicator of the number of hops and a bandwidth) from a home agent (hereinafter referred to as HA) to a link as a transfer destination is large, the overall network performance is possibly lowered.

The conventional problems will be described in specific detail below with reference to FIGS. 1, 2, and 3 of the accompanying drawings.

FIG. 1 is a view showing a system arrangement of a conventional CDMA mobile communication system. As shown in FIG. 1, a mobile communication system is connected to IP network 1, and CN 3 on link 2 connected to IP network 1 is communicating with MN 61 having a fixed IP address in cell 31 covered by BTS 21 on link 11. Communications between CN 3 and MN 61, including communications between BTS 21 and MN 61, are carried out according to the IP. When MN 61 moves toward cell 32, MN 61 attempts to make handover to BTS 22 covering cell 32.

After handover, since MN 61 communicates with BTS 22, MN 61 needs to communicate with CN 3 via link 12. However, since CN 3 does not recognize that MN 61 has moved to cell 32, CN 3 tries to communicate with MN 61 via link 11. Consequently, CN 3 loses communications with MN 61.

According to the mobile IP optimized for the mobile communication environment, MN 61 sends a binding update message indicative of handover to HA 41 on link 11. After MN 61 has made handover, HA 41 transfers data that is transmitted from CN 3 to link 11 to MN 61 which is now located in cell 32 covered by BTS 22 that is connected to link 12. Therefore, CN 3 and MN 61 keep communicating with each other without causing CN 3 to recognize that MN has moved to cell 32.

A handover process in the conventional CDMA mobile communication system will be described in specific detail below with reference to FIGS. 1, 2, and 3.

First, a procedure for MN 61 to make handover from cell 31 to cell 32 will be described below with reference to a sequence chart shown in FIG. 2.

(1) MN 61 performs IP communications with CN 3 via BTS 21 in cell 31 from which MN 61 is to make handover in step 201. BTS 21 converts between radio data and IP packets in step 202. This is indicated as state A in FIGS. 1 and 2.

(2) When MN 61 moves to a boundary between cell 31 and cell 32 in step 203, MN 61 makes handover from cell 31 to cell 32 as follows:

(3) MN 61 acquires a care-of address (hereinafter referred to as CoA) representing address information of link 12 in cell 32 to which MN 61 attempts to be connected, via BTS 22 in step 204.

(4) MN 61 includes the acquired CoA in a binding update message and sends the binding update message to HA 41 in step 205, and receives data from cell 12.

(5) When HA 41 receives the binding update message from MN 61, HA 41 encapsulates IP packet data for MN 61, and sends the encapsulated IP packet data via IP network 1 and a route 51 to BTS 22 which is indicated by the CoA contained in the binding update message in step 207.

(6) When BTS 22 receives the encapsulated IP packet data for MN 61 from HA 41, BTS 22 decapsulates the data, and sends the data as radio data to MN 61 in step 208. This is indicated as state B in FIGS. 1 and 2.

A procedure for MN 61 which has moved to cell 38 to make handover to cell 39 will be described below with reference to FIGS. 1 and 3. The handover operation is the same as when MN 61 makes handover from cell 31 to cell 32 as described above. The procedure will be described below in order to clarify that the data is necessarily transferred from HA 1 to a BTS in the cell to which MN 61 has moved.

(1) MN 61 performs IP communications with CN 3 via HA 41 and BTS 28 in cell 38 from which MN 61 is to make handover in steps 209, 210, 211. BTS 28 converts between radio data and IP packets in step 211. This is indicated as state X in FIGS. 1 and 3.

(2) When MN 61 moves to a boundary between cell 38 and cell 39 in (3) MN 61 acquires a CoA of link 19 in cell 32 to which MN 61 attempts to be connected, via BTS 29 in step 213.

(4) MN 61 includes the acquired CoA in a binding update message and sends the binding update message to HA 41 in step 214, and receives data from cell 39.

(5) When HA 41 receives the binding update message from MN 61, HA 41 encapsulates IP packet data for MN 61, and sends the encapsulated IP packet data via IP network 1 and a route 52 to BTS 29 which is indicated by the CoA contained in the binding update message in step 216.

(6) When BTS 29 receives the encapsulated IP packet data for MN 61 from HA 41, BTS 29 decapsulates the data, and sends the data as radio data to MN 61 in step 217. This is indicated as state Y in FIGS. 1 and 3.

As described above, the conventional CDMA mobile communication system allows CN 3 to continue communications with MN 61 without regard to the present position of MN 61 even when MN 61 moves through cells 31-39. However, the conventional handover process suffers the following drawbacks:

The first drawback is that when MN 61 moves to another link, a packet loss (loss of data) tends to occur. This is because CN 3 and MN 61 are unable to communicate with each other for a period of time after MN 61 cannot receive data from the former BTS when MN 61 moves to another link until MN 61 detects the CoA of the link to which MN 61 has moved, and also for a period of time until MN 61 tells HA 41 that MN 61 has moved and HA 41 starts to transfer the data. Japanese laid-open patent publication No. 2004-135178, for example, discloses a process of transferring data in advance from HA 41 to a cell (cell 32 in FIG. 1) near cell 31 from which MA 61 moves, and sending radio data to a nearby cell. Though the disclosed process can prevent a packet loss from occurring, it is disadvantageous in that radio resources cannot effectively be utilized because the radio data is transmitted to an unnecessary cell. Furthermore, if there are many nearby cells, the amount of data transferred by HA 41 is increased, tending to cause a reduction in the performance of nearby networks.

According to another process under study, before MN 61 makes handover, HA 41 buffers data from CN 3, and when MN 61 completes the handover to BTS 22 in cell 32, HA 41 starts to transfer the buffered data to MN 61 on link 21. This process does not produce a packet loss upon handover. However, the communications between MN 61 and CN 3 suffer a short-break until the handover from MN 61 is finished. In addition, it is assumed that HA 41 is liable to transmit a large amount of buffered data at one time, which flows into IP network 1, tending to lower the performance of the entire network.

The second drawback is that when MN 61 moves from link 11 to a link with a large metric, a delay may be caused during the transfer of data from HA 41 to MN 61 and the transfer of a large amount of data may cause a reduction in the performance of the entire network. This is indicated by the route 52 in FIG. 1.

SUMMARY OF THE INVENTION

It is therefore an object of the present invention to provide a handover process for use in a CDMA mobile communication system on an ALL-IP network, which is capable of performing seamless handover operation without causing a short-break and a packet loss, and a reduction in the performance of the entire network, without regard to movement of a mobile node.

To achieve the above object, a handover process according to the present invention is applied to a CDMA mobile communication system having a plurality of base transceiver stations for sending received radio data as IP packet data to an IP network and sending IP packet data received from the IP network as radio data, and a mobile node for sending radio data to and receiving ratio data from the base transceiver stations and being connected to the IP network through the base transceiver stations to communicate with a correspondent node using a fixed IP address.

According to the present invention, when the mobile node moves to a location near a boundary between a cell in which the mobile node is positioned and another cell adjacent thereto, and makes handover, the mobile node acquires address information of a link to which one of the base transceiver stations in the adjacent cell, includes the acquired address information in a binding update message indicative of the handover, and sends the binding update message to one of the base transceiver stations from which the handover is made.

When the base transceiver station from which the handover is made receives the binding update message from the mobile node, the base transceiver station from which the handover is made continues to send radio data to the mobile node, encapsulates IP packet data for the mobile node, and transfers the encapsulated IP packet data to the base transceiver station to which the handover is made that is indicated by the address information contained in the received binding update message.

When the base transceiver station to which the handover is made receives transferred data from the base transceiver station from which the handover is made, the base transceiver station to which the handover is made decapsulates the IP packet data and sends the decapsulated data as radio data to the mobile node.

Soft handover is performed when the mobile node receives the radio data from the base transceiver stations from which the handover is made and the base transceiver station to which the handover is made. A binding update message including address information is sent to the correspondent node via a link connected to the base transceiver station to which the handover is made when the handover is finished.

Finally, when the correspondent node receives the binding update message from the mobile node, the correspondent node changes routes based on the address information acquired from the received binding update message thereby to select a route for directly sending data to the base transceiver station to which the handover is made.

According to the present invention, when the mobile node makes handover, the mobile node issues a binding update message and sends the binding update message to the base transceiver station from which handover is made. When the base transceiver station from which handover is made sends radio data to the mobile node, it simultaneously transfers the same data to the base transceiver station to which handover is made, so that the base transceiver station to which handover is made also sends the radio data to the mobile node. As a result, the mobile node receives the radio data via the IP network from both the base transceiver station from which handover is made and the base transceiver station to which handover is made. Since the mobile node makes soft handover, the handover can be made without causing a communication short-break and a packet loss. Since radio waves can be received from a plurality of BTSs for rake combination in situations where the power received from a BTS is weak in a cell boundary, the communication quality can be increased.

When the handover is finished, the mobile node sends a binding update message to the correspondent node. The correspondent node uses a route through the base transceiver station to which handover is made. Therefore, the transmission of the radio data from the base transceiver station from which handover is made is put to an end, making it possible to reduce unwanted interference.

Between adjacent base transceiver stations, there may highly possibly be provided an arrangement with a small metric even on the IP network, so that any delay can be reduced in the transfer of data between the base transceiver stations upon handover. Accordingly, the possibility of a reduction in the performance of the overall system can be eliminated though local burdens on the network may be increased.

The above and other objects, features, and advantages of the present invention will become apparent from the following description with reference to the accompanying drawings which illustrate an example of the present invention.

DETAILED DESCRIPTION OF THE PREFERRED EMBODIMENTS

An embodiment of the present invention will be described in detail below with reference to the drawings.

Figure 1:
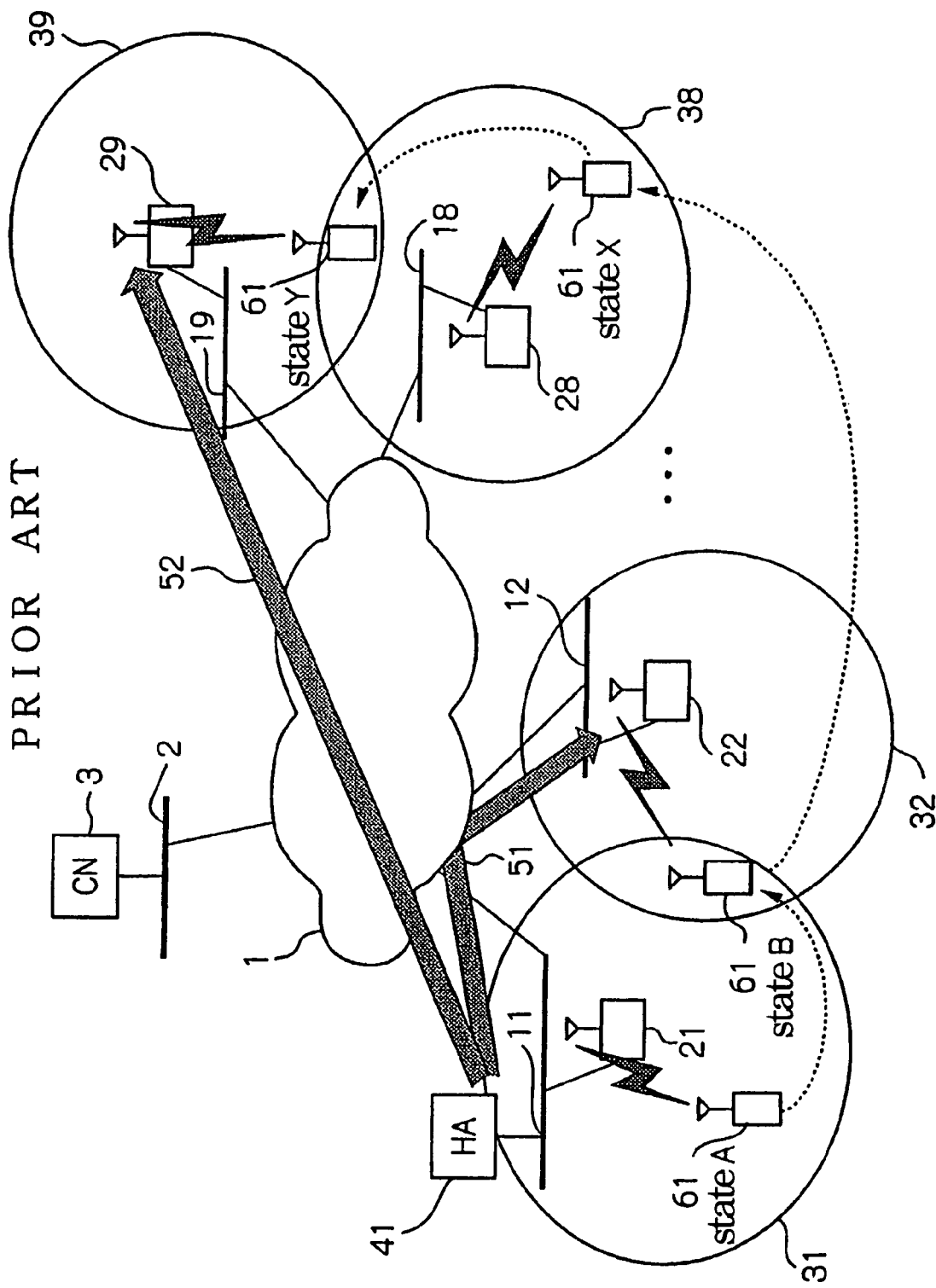
FIG. 1 is a view showing a system arrangement of a conventional CDMA mobile communication system.
Figure 2:
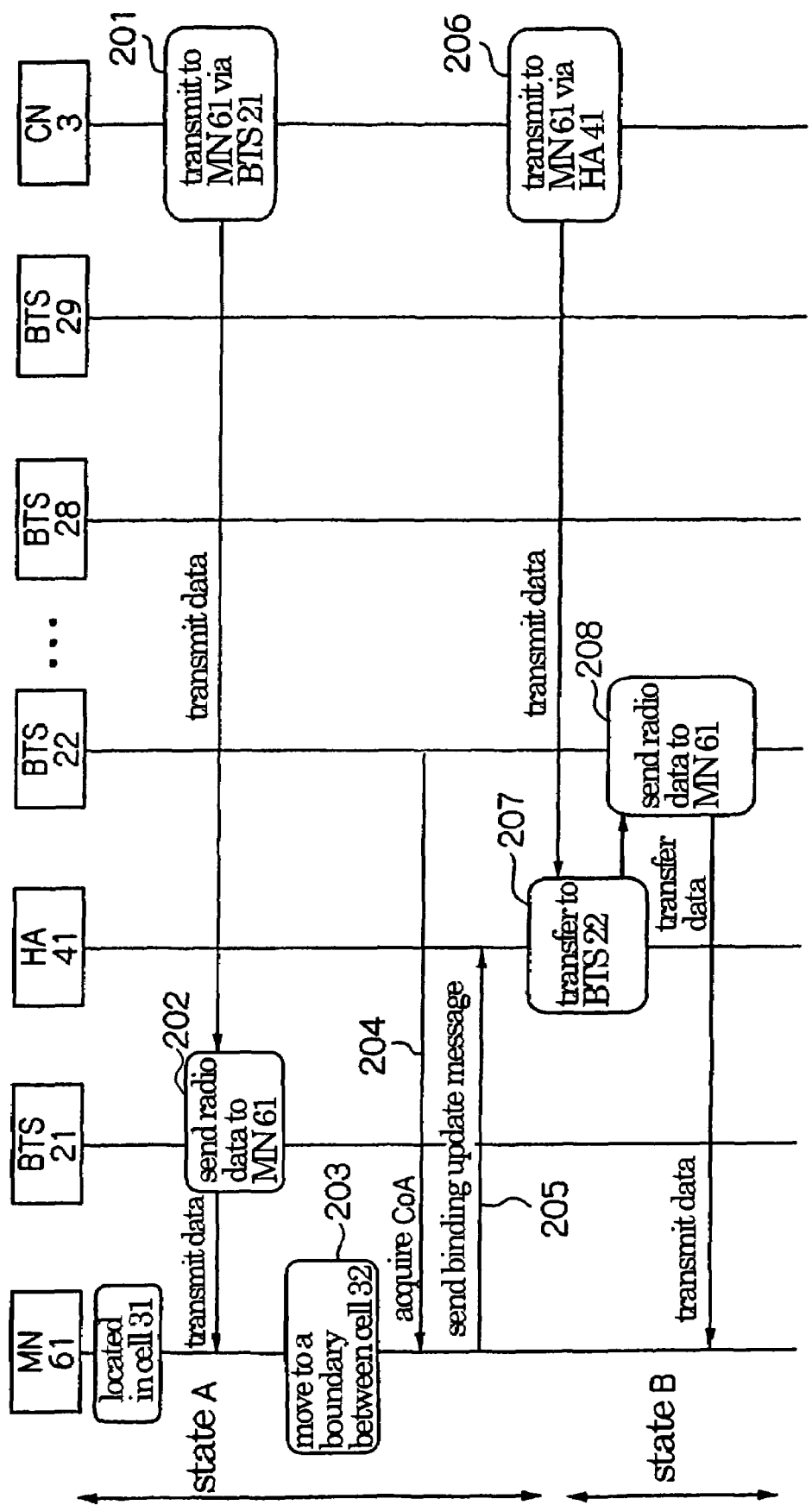
FIG. 2 is a sequence chart illustrative of a procedure for MN 61 to make handover from cell 31 to cell 32.
Figure 3:
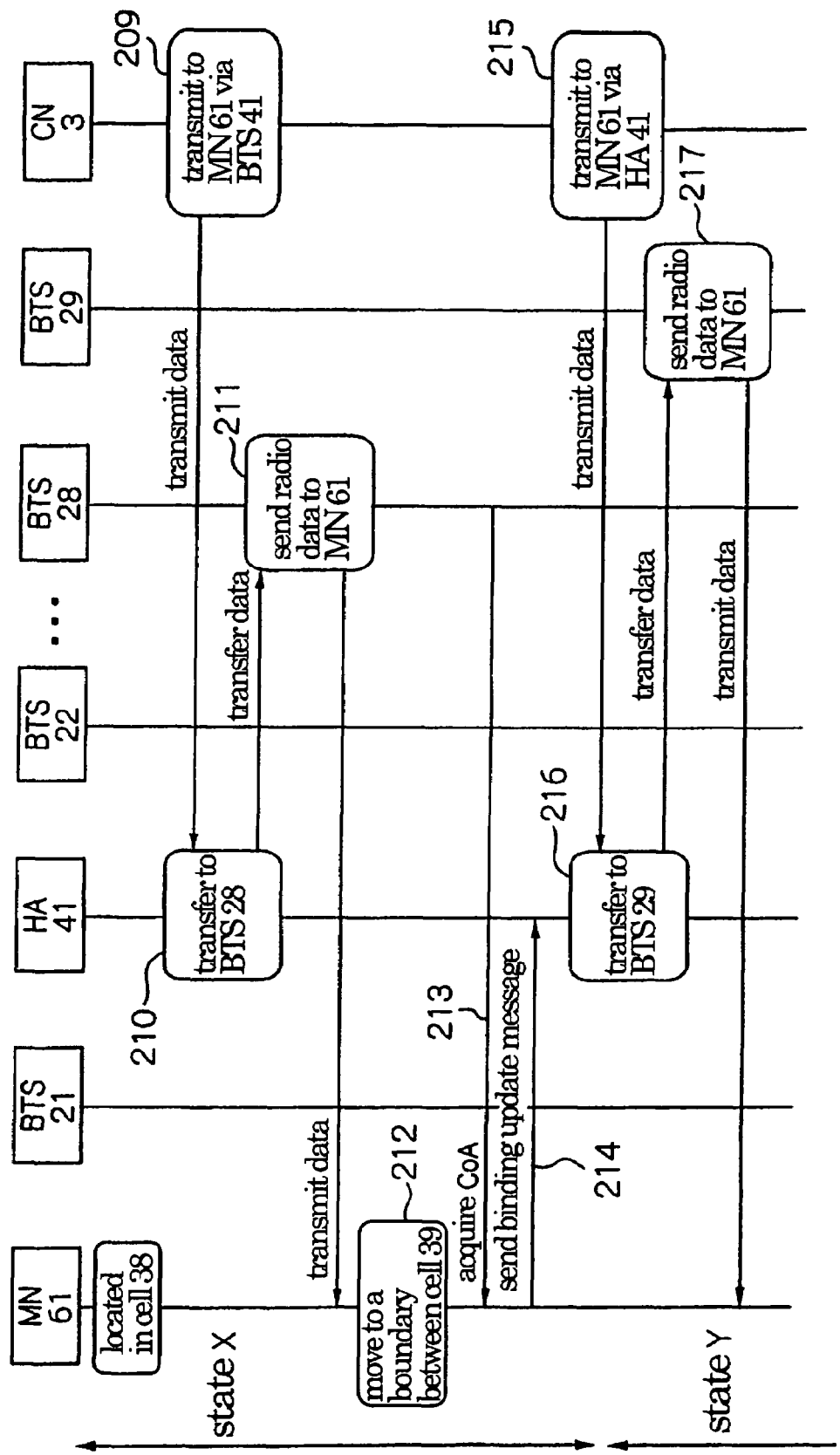
FIG. 3 is a sequence chart illustrative of a procedure for MN 61 to make handover from cell 38 to cell 39.
Figure 4:
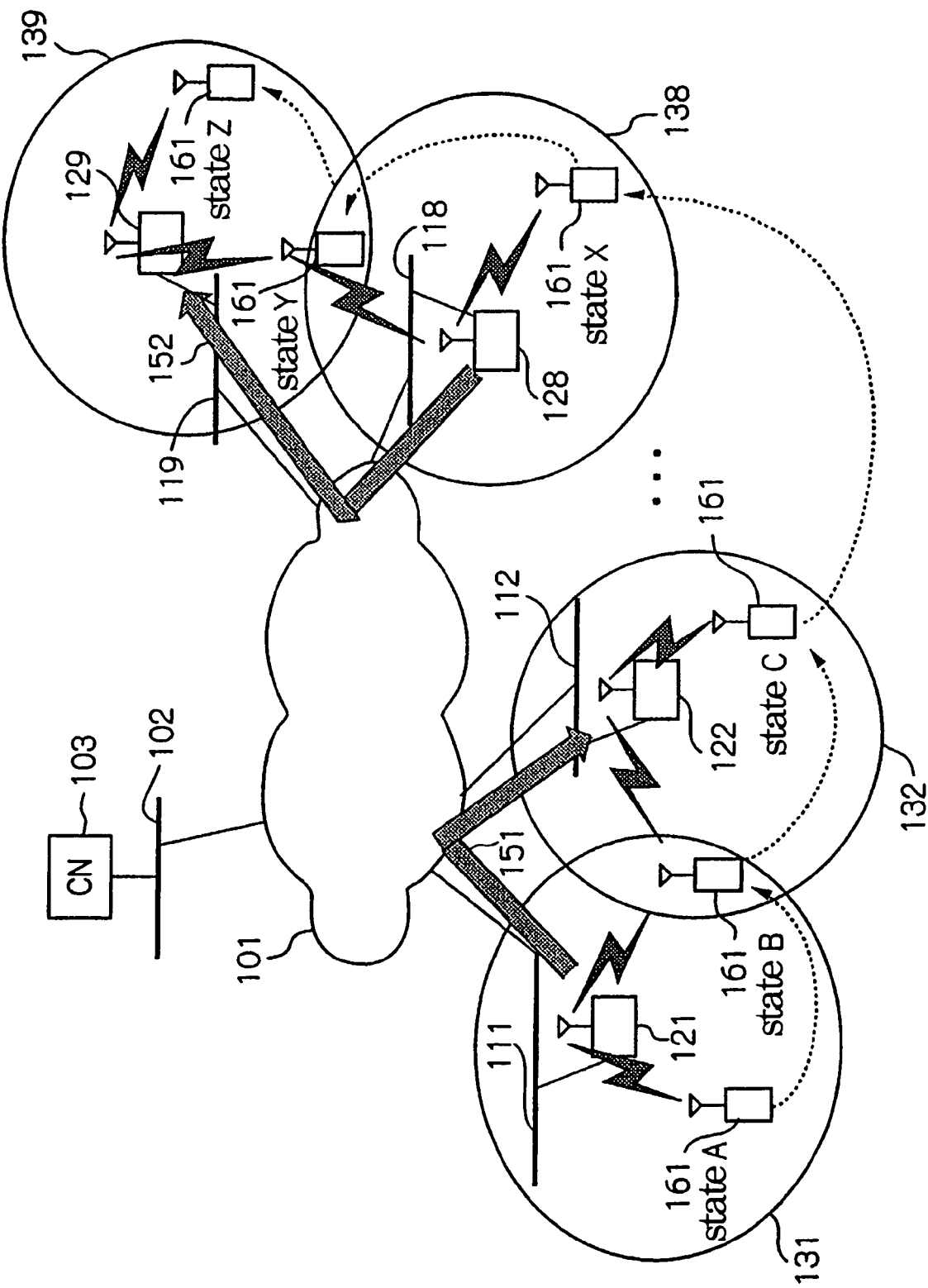
FIG. 4 is a view showing a system arrangement of a CDMA mobile communication system according to an embodiment of the present invention.

FIG. 4 shows a system arrangement of a CDMA mobile communication system according to an embodiment of the present invention. As shown in FIG. 4, the CDMA mobile communication system according to the embodiment of the present invention is connected to IP network 101 according to the IPv6, and comprises a plurality of cells 131 through 139.

IP network 101 is an IP network that operates according to the IPv6. As IP network 101 is well known to those skilled in the art and had no direct bearing on the present invention, details of IP network 101 are omitted from illustration.

Link 102 is an inherent network and is connected to IP network 101 through a router, etc. CN 103 is connected to link 102. Link 111 is an inherent network and is connected to IP network 101 through a router, etc. BTS 121 is connected to link 111. Link 112 is an inherent network and is connected to IP network 101 through a router, etc. BTS 122 is connected to link 112. Link 118 is an inherent network and is connected to IP network 101 through a router, etc. BTS 128 is connected to link 118. Link 119 is an inherent network and is connected to IP network 101 through a router, etc. BTS 129 is connected to link 119.

CN 103 connected to link 102 communicates with MN 161 at a fixed IP address.

Cell 131 is covered by BTS 121 that is connected to IP network 101 by link 111, and is positioned adjacent to cell 132. Cell 132 is covered by BTS 122 that is connected to IP network 101 by link 112, and is positioned adjacent to cell 131. Cell 138 is covered by BTS 128 that is connected to IP network 101 by link 118, and is positioned adjacent to cell 139. Cell 139 is covered by BTS 129 that is connected to IP network 101 by link 118, and is positioned adjacent to cell 138.

BTSs 121 through 129 have a function to send radio data received from MN 161 as IP packet data to IP network 101, and send IP packet data received from IP network 101 as radio data MN 161. When BTSs 121 through 129 receive a binding update message from MN 161, BTSs 121 through 129 continue transmitting radio data to MN 161, encapsulate IP packet data for MN 161, and transfer the encapsulated IP packet data to a BTS that is indicated by the CoA contained in the binding update message. Furthermore, when BTSs 121 through 129 receive transferred data from another BTS, BTSs 121 through 129 decapsulate IP packet data, and send the data as radio data to MN 161.

MN 161 has a function to send radio data to and receive radio data from BTSs 121 through 129. MN 161 communicates with CN 103 connected to IP network 101 via BTS using a fixed IP address.

When MN 161 moves to a location near a boundary between a cell in which MN 161 is positioned and another cell adjacent thereto, MN 161 attempts to make handover to an adjacent BTS which covers the adjacent cell. Upon handover, MN 161 acquires the CoA of a link to which the BTS which covers the adjacent cell is connected, includes the acquired CoA in a binding update message, and sends the binding update message to the BTS from which MN 161 has made handover. After having sent the binding update message, MN 161 receive data from both the BTS from which MN 161 has made handover and the adjacent BTS, resulting in soft handover. In soft handover, MN 161 does not send the binding update message to CN 103. When MN 161 completes handover, MN 161 sends the binding update message with the CoA to CN 101 via a link to which the adjacent BTS is connected.

As described above, CN 103 to link 102 communicates with MN 161 at a fixed IP address. When CN 103 receives the binding update message from MN 161, CN 103 changes routes based on the CoA acquired from the binding update message thereby to select a route for directly sending data to a BTS to which MN 162 has made handover. Such a route selecting function is a standard function of the IPv6, and will not be described below.

Figure 5:
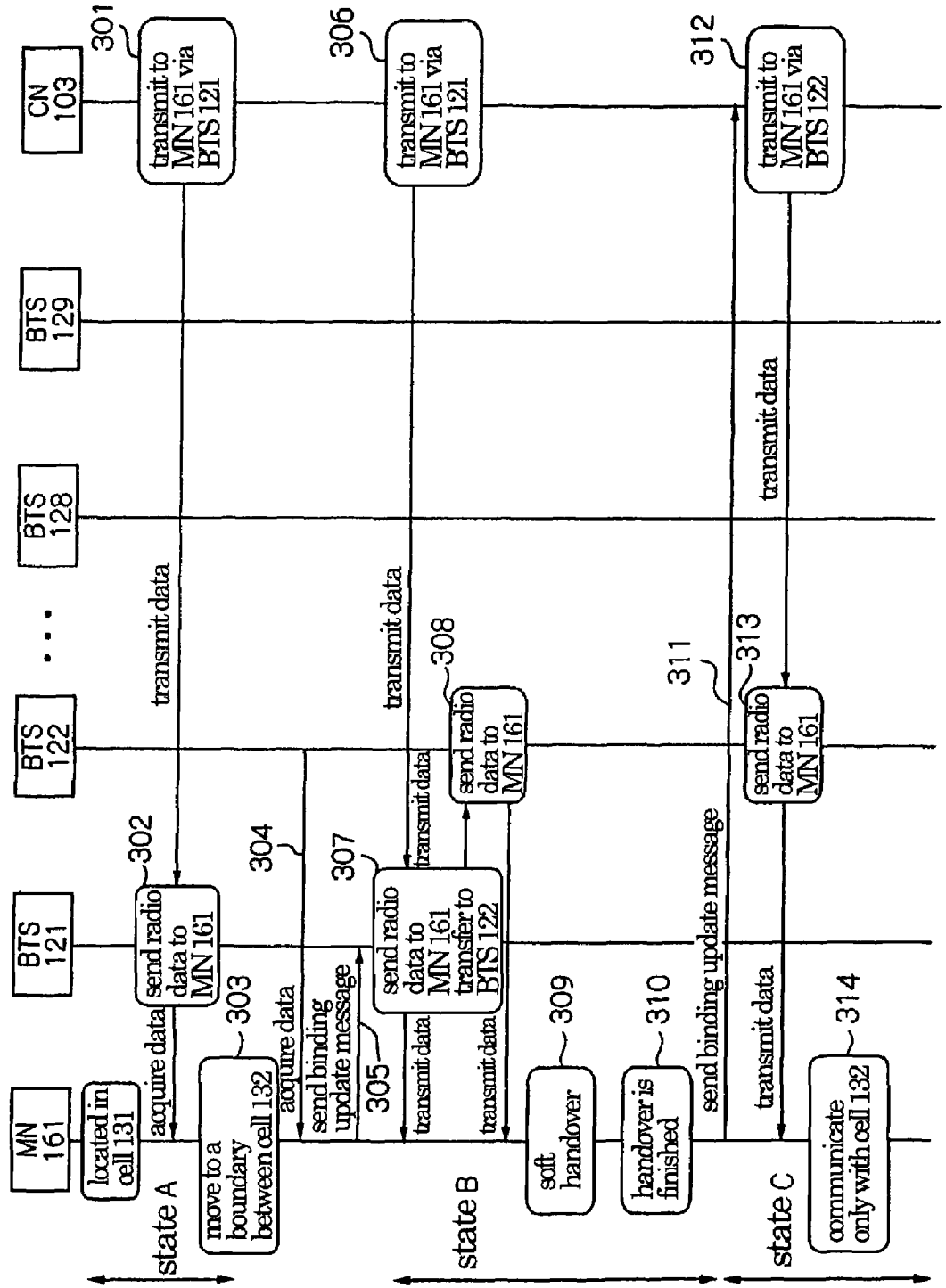
FIG. 5 is a sequence chart illustrative of a procedure for MN 161 to make handover from cell 131 to cell 132.
Figure 6:
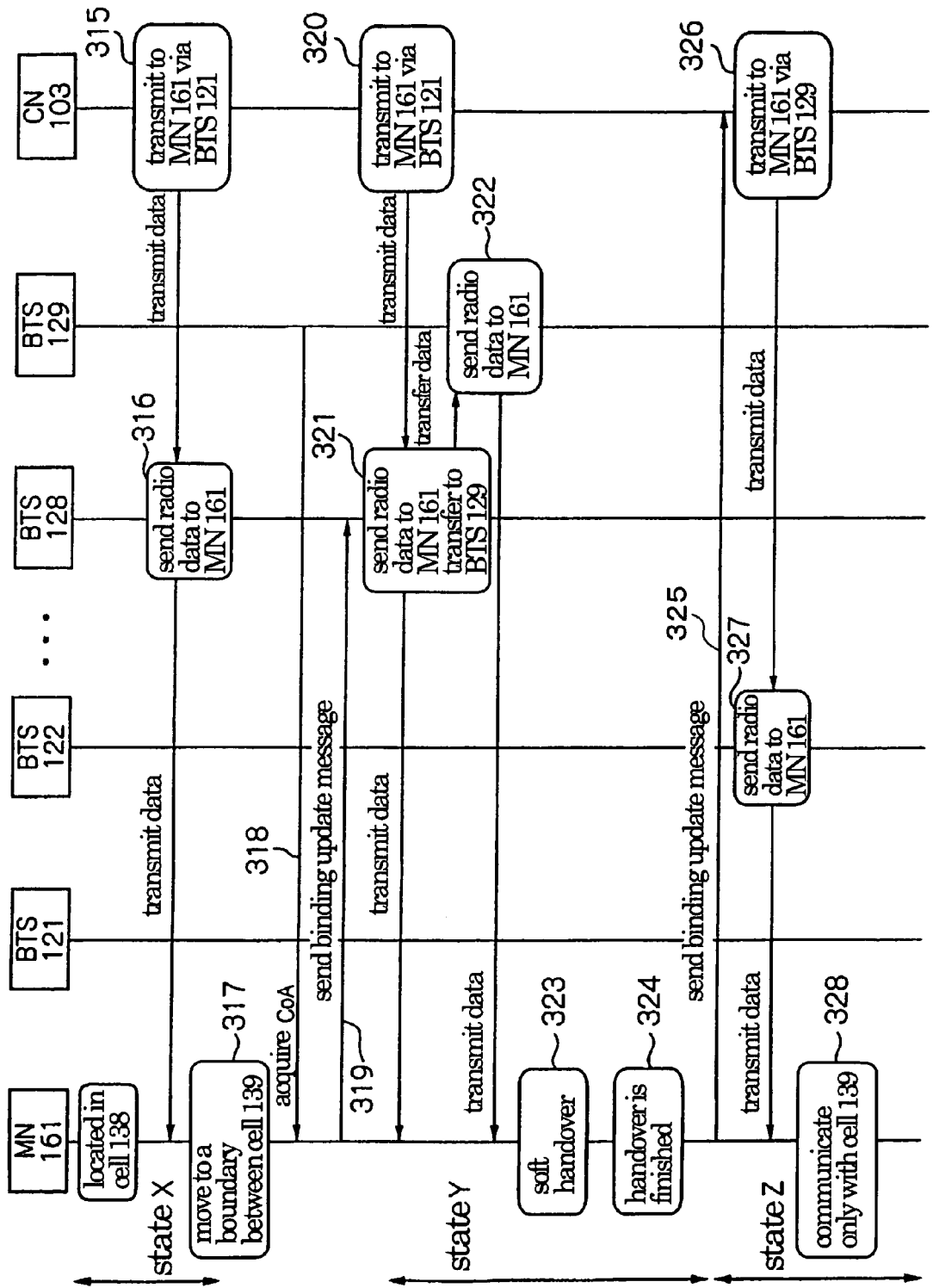
FIG. 6 is a sequence chart illustrative of a procedure for MN 161 to make handover from cell 138 to cell 139.

A handover process according to the present invention in the CDMA mobile communication system according to the embodiment shown in FIG. 4 will be described below with reference to sequence charts shown in FIGS. 5 and 6.

First, a procedure for MN 161 to make handover from cell 131 to cell 132 will be described below with reference to FIG. 5.

(1) MN 161 performs IP communications with CN 103 via BTS 121 in cell 131 from which MN 161 is to make handover in step 301. BTS 121 converts between radio data and IP packets in step 302. CN 103 selects link 111 to which BTS 121 belongs as a route for sending IP packets. This is indicated as state A in FIGS. 4 and 5.

(2) When MN 161 moves to a boundary between cell 131 and cell 132 in step 303, MN 161 makes handover from cell 131 to cell 132 as follows:

(3) MN 161 acquires a CoA of link 112 in cell 132 via BTS 122 in step 304.

(4) MN 161 includes the acquired CoA in a binding update message and sends the binding update message to BTS 121 in step 305.

(5) When BTS 121 receives the binding update message from MN 161, BTS 121 sends radio data to MN 161, and at the same time encapulates IP packet data for MN 161 and transfers the encapulated IP packet data via route 151 and IP network 101 to BTS 122 which is indicated by the CoA contained in the binding update message in step 307.

(6) When BTS 122 receives the transferred data for MN 161 from BTS 121, BTS 122 decapsulates the data and sends the decapsulated data as radio data to MN 161 in step 308.

(7) Since MN 161 receives the same data from BTS 121 and BTS 122, soft handover is performed in step 309. This is indicated as state B in FIGS. 4 and 5.

(8) When the handover from MN 161 is finished in step 310, MN 161 sends a binding update message via BTS 122 and link 112 to CN 103 in step 311.

(9) When CN 103 receives the binding update message from MN 161, CN 103 changes the route for sending IP packets to MN 161 from link 111 to which BTS 121 belongs to link 112 to which BTS 122 belongs in step 312.

(10) MN 161 receives data only from BTS 122 in step 314, whereupon handover is put to an end. This is indicated as state C in FIGS. 4 and 5.

A procedure for MN 161 which has moved to cell 138 to make handover to cell 139 will be described below with reference to FIG. 6. The handover operation is the same as when MN 161 makes handover from cell 131 to cell 132 as described above. The procedure will be described below in order to clarify that the data is necessarily transferred a BTS from which handover is made to a BTS to which handover is made.

(1) MN 161 performs IP communications with CN 103 via BTS 128 in cell 138 from which MN 161 is to make handover in step 315. BTS 128 converts between radio data and IP packets in step 316. CN 103 selects link 118 to which BTS 128 belongs as a route for sending IP packets. This is indicated as state X in FIGS. 4 and 6.

(2) When MN 161 moves to a boundary between cell 138 and cell 139 in step 317, MN 161 makes handover from cell 138 to cell 139 as follows:

(3) MN 161 acquires a CoA of link 119 in cell 139 via BTS 129 in step 318.

(4) MN 161 includes the acquired CoA in a binding update message and sends the binding update message to BTS 128 in step 319.

(5) When BTS 128 receives the binding update message from MN 161, BTS 128 sends radio data to MN 161, and at the same time encapulates IP packet data for MN 161 and transfers the encapulated IP packet data via IP network 101 and route 152 to BTS 129 which is indicated by the CoA contained in the binding update message in step 321.

(6) When BTS 129 receives the transferred data for MN 161 from BTS 128, BTS 129 decapsulates the data and sends the decapsulated data as radio data to MN 161 in step 322.

(7) Since MN 161 receives the same data from BTS 128 and BTS 129, soft handover is performed in step 323. This is indicated as state Y in FIGS. 4 and 6.

(8) When the handover from MN 161 is finished in step 324, MN 161 sends a binding update message via BTS 129 and link 119 to CN 103 in step 325.

(9) When CN 103 receives the binding update message from MN 161, CN 103 changes the route for sending IP packets to MN 161 from link 118 to which BTS 128 belongs to link 119 to which BTS 129 belongs in step 326.

(10) MN 161 receives data only from BTS 129 in step 328, whereupon handover is put to an end. This is indicated as state Z in FIGS. 4 and 5.

With the handover process according to the present embodiment, when the MN makes handover, it can receive data from both the BTS from which the MN makes handover and the BTS to which the MN makes handover, resulting in soft handover. Therefore, the MN can make handover without causing a communication short-break and a packet loss. Since radio waves can be received from a plurality of BTSs for rake combination in situations where the power received from a BTS is weak in a cell boundary, the communication quality can be increased. According to an ancillary advantage, a CDMA communication system with a transmission power control capability can reduce the power transmitted from a BTS because of increased communication quality for thereby reducing interference, making it possible to effectively utilize radio resources.

Between BTSs in adjacent cells, there may highly possibly be provided an arrangement with a small metric even on an IP network, so that any delay can be reduced in the transfer of data upon handover. Accordingly, the possibility of a reduction in the performance of the overall system can be eliminated though local burdens on the network may be increased.

While a preferred embodiment of the present invention has been described using specific terms, such description is for illustrative purposes only, and it is to be understood that changes and variations may be made without departing from the spirit or scope of the following claims.

What is claimed is:

1. A handover process for use in a CDMA mobile communication system having a plurality of base transceiver stations for sending received radio data as IP packet data to an IP network and sending IP packet data received from the IP network as radio data, and a mobile node for sending radio data to and receiving ratio data from the base transceiver stations and being connected to the IP network through said base transceiver stations to communicate with a correspondent node using a fixed IP address, said handover process comprising the steps of:

when said mobile node moves to a location near a boundary between a cell in which said mobile node is positioned and another cell adjacent thereto, and makes handover, acquiring address information of a link to which one of the base transceiver stations in the adjacent cell, including the acquired address information in a binding update message indicative of the handover, and sending the binding update message to one of the base transceiver stations from which the handover is made;

when the base transceiver station from which the handover is made receives the binding update message from said mobile node, continuing to send radio data to said mobile node, encapsulating IP packet data for the mobile node, and transferring the encapsulated IP packet data to the base transceiver station to which the handover is made that is indicated by the address information contained in the received binding update message;

when the base transceiver station to which the handover is made receives transferred data from the base transceiver station from which the handover is made, decapsulating the IP packet data and sending the decapsulated data as radio data to said mobile node;

performing soft handover when said mobile node receives the radio data from the base transceiver stations from which the handover is made and the base transceiver station to which the handover is made, and sending a binding update message including address information to the correspondent node via a link connected to the base transceiver station to which the handover is made when the handover is finished; and when the correspondent node receives the binding update message from the mobile node, changing routes based on the address information acquired from the received binding update message thereby to select a route for directly sending data to the base transceiver station to which the handover is made.

2. A handover process according to claim 1, wherein said address information contained in the received binding update message comprises care-of-address information.

* * * * *